Dec. 14, 1937. S. GUARNASCHELLI Re. 20,583

FLEXIBLE TUBING

Original Filed March 3, 1934

INVENTOR
Stephen Guarnaschelli
BY Marshall & Hawley.
ATTORNEYS

Reissued Dec. 14, 1937 Re. 20,583

UNITED STATES PATENT OFFICE 20,583

FLEXIBLE TUBING

Stephen Guarnaschelli, Corona, Long Island, N. Y., assignor to Packless Metal Products Corporation, New York, N. Y., a corporation of Delaware Original No. 2,041,543, dated May 19, 1936, Serial No. 713,825, March 3, 1934. Application for reissue August 31, 1937, Serial No. 161,808

7 Claims. (Cl. 285—72

This invention relates to flexible tubing, and particularly to seamless metallic, preferably spirally corrugated tubing and to fixtures or couplings for joining sections of such tubing and for securing a flexible sheath thereto.

The sale and use of flexible metallic tubing has been limited by the fact that it has been practically impossible to join or splice tubing in the field in case of a break. This has required the user to replace the whole length broken or to employ an expert mechanic or service man to make and seal the joint.

This invention has for its salient object to provide means for securing a flexible sheath of metal or other suitable material to a metallic tubing of the character specified, that is simple and practical in construction and can be easily applied without requiring skill or special tools.

Another object of the invention is to provide a leak-proof coupling for joining together pipe sections of the character specified without soldering or brazing the joint.

Another object of the invention is to provide a leak-proof coupling so constructed and arranged that it can be applied in the field without requiring any particular skill or special tools.

Further details of the invention will appear from the following specification taken in connection with the drawing which forms a part of this application, and in which Fig. 1 is a sectional elevation of one end of a flexible tubing showing the means for securing a flexible sheath thereon, the parts being shown in assembled position, but before the securing means has been compressed or deformed;

The invention briefly described consists, first, of means for securing a flexible sheath to a flexible metallic tubing, this means comprising a pair of threaded members arranged to engage and deform or compress a metallic ring on the sheath thereby fixedly and rigidly securing the sheath to the tubing. The invention furthermore comprises a coupling for forming a leak-proof joint with the end of the flexible tubing. This device comprises a plug or collar having a central bore therethrough and having oppositely facing conical seats adapted to form leak-proof joints. One of these conical seats is arranged to seat in and tightly fit against the outer end of a length of flexible tubing and is forced into seating position by a threaded member which engages the plug or collar and also threadedly engages a sleeve surrounding the end of the tubing. The collar need not necessarily have conical seats but may, if desired, have seats of other shapes or configuration, as for instance, flat seats. In securing the coupling in place an arbor is mounted in the collar or plug and extends into the end portion of the length of tubing to prevent the corrugations from extending into the bore of the tubing as the end of the length is compressed during the mounting of the coupling thereon.

Further details of the invention will appear from the following description.

Figure 1:
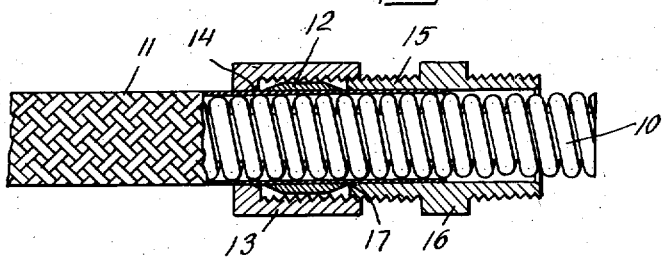
Figure 2:
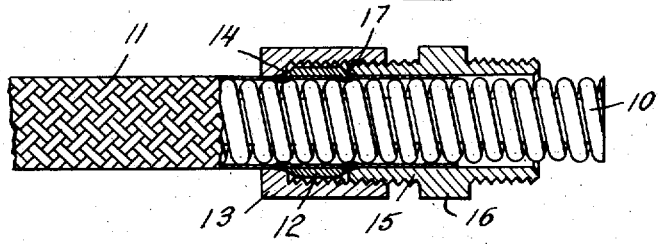
Fig. 2 is a sectional elevation similar to Fig. 1, but showing the sheath secured to the tubing.

In Figs. 1 and 2 there is shown one end 10 of a length of flexible metallic tubing which is surrounded by a flexible metallic sheath 11. The sheath 11 is secured in position by a collar or ring 12 formed of compressible or deformable metal, the collar being slipped over the sheath and tubing, as shown in Fig. 1. A nut 13 having interior threads thereon is mounted on the sheath and tubing and has formed in one end thereof a shoulder 14. A sleeve 15 is provided with threads at each end thereof, the central portion of the sleeve having flat outer surfaces 16 adapted to receive a wrench. The sleeve is threaded into the nut 13 and one end 17 of the sleeve engages one edge of the collar or ring 12. As the nut and sleeve are threaded on each other the ring 12 is compressed or deformed and tightly grips the sheath 11, portions of the ring being adapted to enter the interstices in the sheath.

It will be obvious that the sheath can be secured easily and quickly by threading the sleeve and nut together around the deformable ring and that this operation will not require any skill or special tools.

Figure 3:
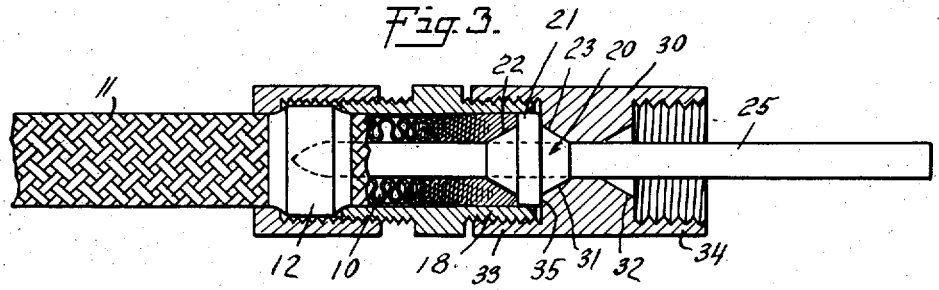
Fig. 3 is a sectional elevation illustrating a flexible tubing with the sheath secured thereon and with a coupling mounted on the end of the tubing and having a leak-proof joint.
Figure 4:
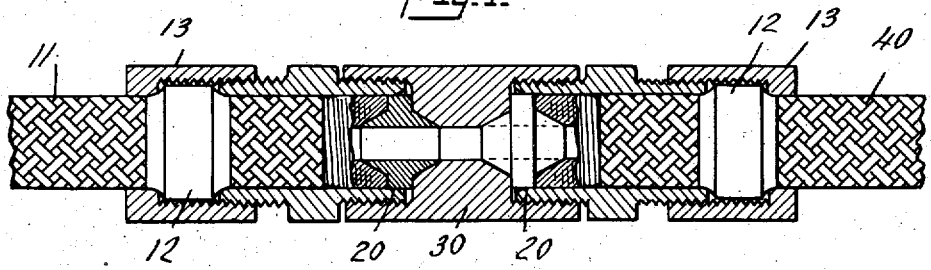
Fig. 4 is a sectional elevation showing two lengths of flexible metallic tubing connected together by leak-proof couplings and having mounted thereon and secured thereto flexible sheaths.

Figs. 3 and 4 illustrate means used in conjunction with the sheath securing means for forming a leak-tight joint at the end of the tube. In order to form such a joint a plug or collar 20 is placed in the end of the tubing, this plug having a central flange 21 and, preferably, oppositely facing conical seats 22 and 23. The seats on the collar need not necessarily be conical, but may be flat, or any other desired shape. In order to prevent the corrugation of the seamless tubing from being forced inwardly to such an extent as to obstruct the passage or bore through the tubing a mandrel 25 is placed in the outer end portion of the tubing and extends through the bore of the plug or collar 20, as shown in Fig. 3. A coupling member 30 is provided with oppositely facing conical seats 31 and 32 and also with oppositely extended threaded end portions 33 and 34. The member 30 is placed over the mandrel and collar and is threaded on a threaded end portion 18 of the sleeve 15. As these parts are threaded together the flange 21 on the collar or plug 20 will engage a shoulder 35 in the member 30 and the conical seat 22 will be forced into the end of the tube compressing the corrugations, as shown in Fig. 3, and forming a conical seat for the portion 22. After a tight joint has thus been formed the mandrel 25 can be withdrawn. This structure is illustrated in Fig. 3, and in Fig. 4 there is shown another length 40 of tubing joined to the coupling member 30 in the same manner as the left hand length is joined thereto, as above described, and as illustrated in Fig. 3. If desired, the tube end can be compressed and the conical seat 22 can be formed by hammer blows on the tool or mandrel 25.

By means of the coupling or fixture above explained, a leak-proof or leak-tight joint can be formed between the ends of lengths of tubing without requiring soldering, brazing or any particular skill or special tools. Thus, if a break occurs in a length of tubing in the field the portion having the break therein can be cut off and another length can be joined thereto easily and quickly by the method and coupling means described.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In combination, a flexible metallic, corrugated tube, a coupling member surrounding an end portion of the tube, means for anchoring said member at a point spaced from said end, against movement in the direction of said end, the inner surface of said member being spaced from the outer surface of the end portion of the tube, a second coupling member threaded to said first coupling member and enclosing a conical projection arranged to engage the end of the tube and as said second coupling member is threaded on said first coupling member to compress the end of the tube, beyond said anchor point, into a substantially solid mass and for forming a seal between the tube and conical projection.

2. In combination, a flexible metallic, corrugated tube, a coupling member having a substantially smooth inner surface spaced from and surrounding an end portion of the tube, means for anchoring said member at a point spaced from said end, against movement in the direction of said end, a second coupling member threaded to said first coupling member and enclosing a conical projection arranged to engage the end of the tube and as said second coupling member is threaded on said first coupling member to compress the end of the tube, beyond said anchor point, into a substantially solid mass and for forming a seal between the tube and conical projection.

3. In combination, a flexible metallic, corrugated tube, a coupling member surrounding an end portion of the tube, means for anchoring said member at a point spaced from said end, against movement in the direction of said end, the inner surface of the end portion of said coupling member being spaced from the outer surface of the tube, a second coupling member threaded to said first coupling member and enclosing a member having a conical seat arranged to engage the end of the tube and as said second coupling member is threaded on said first coupling member to compress the end of the tube, beyond said anchor point, into a substantially solid mass and for forming a seal between the tube and conical projection.

4. In combination, a flexible metallic, corrugated tube, a flexible metallic sheath surrounding the tube, a deformable metallic ring compressed on said sheath and tube and anchored thereto at a point spaced from the end thereof, a sleeve surrounding the end of the sheath and tube beyond the ring, a nut abutting the end of the ring remote from the end of the tube and surrounding the ring and in threaded engagement with the sleeve, and means coacting with the sleeve to compress the end portion of the tube into a substantially solid mass and form a seal between said tube and said means.

5. In combination, a flexible metallic, corrugated tube, a flexible metallic sheath surrounding the tube, a deformable metallic ring compressed on said sheath and tube and anchored thereto at a point spaced from the end thereof, a sleeve surrounding the end of the sheath and tube beyond the ring, a nut abutting the end of the ring remote from the end of the tube and surrounding the ring and in threaded engagement with the sleeve, and means coacting with the sleeve to compress the end portion of the tube into a substantially solid mass and form a seal between said tube and said means, said last named means including a member having a conical seat movable into the outer end of the sleeve.

6. In combination, a flexible metallic, corrugated tubing, a threaded member mounted thereon and anchored against movement relative thereto in a direction toward the end of the tubing, at a point spaced from the end of the tubing, a connection threaded to said threaded member, and a conduit member disposed in said connection and having conical seats forced thereby into tight sealing relation against the end of the tubing and against the connection, the end portion of the tubing being compressed within said threaded member into a substantially solid mass.

7. In combination, a flexible metallic, corrugated tubing, a threaded member mounted thereon and anchored against movement relative thereto in a direction toward the end of the tubing, at a point spaced from the end of the tubing, a connection threaded to said threaded member, and a conduit member disposed in said connection and having seats forced thereby into tight sealing relation against the end of the tubing and against the connection, the end portion of the tubing being compressed within said threaded member into a substantially solid mass.

STEPHEN GUARNASCHELLI.